US010382240B2

(12) United States Patent
Dore

(10) Patent No.: US 10,382,240 B2
(45) Date of Patent: Aug. 13, 2019

(54) FBMC-MIMO TRANSMISSION/RECEPTION SYSTEM WITH ML DETECTION

(71) Applicant: COMMISSARIAT A L'ENERGIE ATOMIQUE ET AUX ENERGIES ALTERNATIVES, Paris (FR)

(72) Inventor: Jean-Baptiste Dore, Fontanil-Cornillon (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 0 days.

(21) Appl. No.: 15/909,469

(22) Filed: Mar. 1, 2018

(65) Prior Publication Data

US 2018/0254937 A1 Sep. 6, 2018

(30) Foreign Application Priority Data

Mar. 2, 2017 (FR) ...................................... 17 51697

(51) Int. Cl.
*H04K 1/10* (2006.01)
*H04L 27/26* (2006.01)
*H04L 27/34* (2006.01)
*H04B 7/0413* (2017.01)

(52) U.S. Cl.
CPC ........ *H04L 27/264* (2013.01); *H04L 27/2647* (2013.01); *H04L 27/2697* (2013.01); *H04L 27/2698* (2013.01); *H04L 27/3405* (2013.01); *H04B 7/0413* (2013.01)

(58) Field of Classification Search
CPC ............... H04L 27/264; H04L 27/2647; H04L 27/2697; H04L 27/2698; H04L 27/3405; H04B 7/0413

USPC ........................................................ 375/260
See application file for complete search history.

(56) References Cited

U.S. PATENT DOCUMENTS 9,178,739 B2\* 11/2015 Phan Huy ............ H04B 7/0669
2017/0187489 A1\* 6/2017 Myung ............... H03M 13/1102

FOREIGN PATENT DOCUMENTS

CN 106712903 5/2017

OTHER PUBLICATIONS

French Preliminary Search Report dated Nov. 10, 2017 in French Application 17 51697 filed on Mar. 2, 2017 (with English Translation of Categories of Cited Documents).
Marius Caus, et al., "Low-complexity soft-output MIMO detection in FBMC/OQAM systems," Latest Trends on Communications, pp. 25-29.

(Continued)

*Primary Examiner* — Helene E Tayong
(74) *Attorney, Agent, or Firm* — Oblon, McClelland, Maier & Neustadt, L.L.P.

(57) ABSTRACT

A transmitter of an FBMC-MIMO system in which, for each FBMC-OQAM modulator associated with a transmission antenna, the symbols of a block to be transmitted are grouped in pairs, the input symbols in a pair being combined to output first and second combined symbols, the combined symbols being input to the FBMC-OQAM modulator. The invention also relates to a receiver including an FBMC-OQAM demodulator and an ML detector from the observables obtained, for each reception antenna. The used ML detection allows for not being affected by intrinsic interference and obtaining a high degree of diversity without increasing the number of antennas.

10 Claims, 5 Drawing Sheets

(56) References Cited

OTHER PUBLICATIONS

Maurice Bellanger, "Transmit diversity in multicarrier transmission using OQAM modulation," 2008, pp. 727-730.
Pierre Siohan, et al. "Analysis and Design of OFDM/OQAM Systems Based on Filterbank Theory," IEEE Transactions on Signal Processing, vol. 50, No. 5, May 2002, pp. 1170-1183.

* cited by examiner

FBMC-MIMO TRANSMISSION/RECEPTION SYSTEM WITH ML DETECTION

TECHNICAL DOMAIN

This invention generally relates to the field of telecommunication systems using a Filter Bank Multi-Carrier modulation, also called FBMC systems. It also relates to Multiple Input Multiple Output (MIMO) telecommunication systems.

STATE OF PRIOR ART

Telecommunication systems using multi-carrier modulation are well known in the state of the art. The principle of such a modulation consists of dividing the transmission band into a plurality of frequency sub-channels associated with sub-carriers and modulating each of these sub-carriers with the data to be transmitted.

The most widespread multi-carrier modulation is undoubtedly OFDM (Orthogonal Frequency Division Multiplexing) modulation. This modulation is used in WLAN, Wifi wireless local networks, in high speed wireless internet access (WiMAX), digital radio broadcasting systems (DVB-T, ISDB-T, DAB), asymmetric digital links (xDSL), etc.

In an OFDM transmission system, each block of OFDM symbols is preceded by a guard interval or a cyclic prefix longer than the time spread of the pulse response of the channel, so as to eliminate inter-symbol interference. However, the insertion of a guard interval or a prefix causes a loss of spectral efficiency. Finally, OFDM modulation is not an optimum solution for applications requiring high out-of-band rejection rates because the spectral occupancy of an OFDM signal is significantly larger than the band of sub-carriers that it uses due to spreading of secondary lobes.

More recently an FBMC (Filter Bank Multi Carrier) modulation was proposed as an alternative to OFDM modulation.

The principle of FBMC modulation is based on a synthesis by filter bank on transmission and an analysis by filter bank on reception. Transmission and reception filters are versions of a prototype filter offset in frequency and in time.

An introduction to FBMC modulation is given in the article by B. Hirosaki entitled "An orthogonally multiplexed QAM system using the discrete Fourier transform" published in IEEE Trans on Comm., vol. 29 No. 7, pp. 982-989, July 1981, and in the article by P. Siohan et al. entitled "Analysis and design of OFDM/OQAM systems based on filterbank theory" published in IEEE Trans. on signal processing, vol. 50, No 5, pp. 1170-1183, May 2002.

An FBMC transmission/reception system can be represented in the time domain, or also in the frequency domain. A description of these two representations is given in the application published in reference FR-A-3003420 submitted in the name of this applicant.

In general, if the real symbols to be transmitted (in particular, these real symbols can be the real and imaginary parts of QAM symbols to be transmitted) are denoted $x_{k,n}$, in which k is the index of the sub-carrier and n is the index of the symbols block, the signal transmitted by the FBMC transmitter can be written in base band in the following form:

$$s(t) = \sum_{k=0}^{M-1} \sum_{n \in Z} x_{k,n} g\left(t - n\frac{T}{2}\right) e^{j\frac{2\pi}{T}kT} e^{j\phi_{k,n}} \quad (1)$$

in which g(t) is the response of the prototype filter, T is the time interval separating two consecutive symbol blocks, and:

$$\phi_{k,n} = \frac{\pi}{2}(k+n) - \pi k n \quad (2)$$

is a phase term dependent on the time index n and the carrier index k.

The expression (1) can be written equivalently in a discrete form:

$$s(m) = \sum_{k=0}^{M-1} \sum_{n \in Z} x_{k,n} g_{k,n}(m) \text{ in which} \quad (3)$$

$$g_{k,n}(m) = g(m - nM/2) e^{j\frac{2\pi}{M}k(m-D/2)} e^{j\phi_{k,n}} \quad (4)$$

is the response of the synthesis filter bank with the OQAM modulation, $e^{j\phi_{k,n}}$ being the above-mentioned phase term, in is a temporal index, M is the (even) number of sub-carriers, g(m) is the response of the prototype filter, $g_{k,n}(m)$ is a version of the response of the prototype filter offset in time and frequency, weighted by a phase term representing the OQAM modulation, D=KM−1 in which K is the overlap factor of synthesis filters, or equivalently the pulse response of the prototype filter.

Assuming that the channel is not very selective in frequency (in other words it is said to be "flat" within a sub-channel) and has no delay, the response of the trans-multiplexer filter (in other words the association of the synthesis filter bank and the analysis filter bank) corresponding to a unit excitation of the time-frequency pair $(n_0, k_0)$ at the transmitter end in which $n_0$ is a time index and $k_0$ is a sub-carrier index, is given by:

$$r_{k',n'} = \sum_{m=-\infty}^{+\infty} g_{k_0,n_0}(m) g^*_{k',n'} =$$
$$e^{j\pi(k_0+\delta k)\delta n} e^{-j\frac{\pi}{2}(\delta k + \delta n)} \sum_{m=-\infty}^{+\infty} g(m) g(m - \delta n.M/2) e^{j\frac{2\pi}{M}\delta k\left(\frac{D}{2}-m\right)} \quad (5)$$

in which $\delta n = n' - n_0$ and $\delta k = k' - k_0$. The prototype filter is chosen such that its pulse response satisfies the real orthogonality condition:

$$\Re e\left(\sum_{m=-\infty}^{+\infty} g_{k',n'}(m) g^*_{k,n}(m)\right) = \delta_{k,k'} \delta_{n,n'} \quad (6)$$

in which $\Re e$ is the real part and $\delta$ is the Kronecker symbol. It can be understood from expression (5) that interference affecting the real symbol $x_{k,n}$ can be eliminated in that it is purely imaginary. More precisely, intrinsic interference, $I_{k,n}$, in other words interference due to nearby symbols $x_{k',n'}$, $(k',n') \in \Omega_{k,n}$ in which $\Omega_{k,n}$ is the time-frequency support of the response of the transmultiplexer filter centred on the $x_{k,n}$ symbol, can be expressed as:

$$I_{k,n} = \sum_{(k',n') \in \Omega_{k,n}} x_{k',n'^0} \sum_{m=-\infty}^{+\infty} g_{k',n'}(m) g_{k,n}^*(m) \quad (7)$$

This term is purely imaginary due to the OQAM modulation, in other words the alternation of real values and imaginary values due to the phase term $e^{j\Phi_{k,n}}$ in expression (4). For this reason, it is denoted $I_{k,n} = ji_{k,n}$. Note that interference $i_{k,n}$ is generated by past and future symbols carried by the same carrier (k) and by adjacent carriers.

The following table represents the unit response $r_{k,n}$ of the transmultiplexer filter corresponding to a unit excitation of the time-frequency pair $(n_0, k_0)$ in the case in which the PHYDIAS filter is used with K=4:

|       | $n_0 - 3$ | $n_0 - 2$ | $n_0 - 1$ | $n_0$  | $n_0 + 1$ | $n_0 + 2$ | $n_0 + 3$ |
|-------|-----------|-----------|-----------|--------|-----------|-----------|-----------|
| $k_0 - 1$ | $-0.043j$ | $-0.125$  | $0.206j$  | $0.239$ | $-0.206j$ | $-0.125$  | $0.423j$  |
| $k_0$ | $-0.067$  | $0$       | $0.564$   | $1$    | $0.564$   | $0$       | $-0.067$  |
| $k_0 + 1$ | $0.423j$  | $-0.125$  | $-0.206j$ | $-0.239$ | $0.206j$  | $-0.125$  | $-0.043j$ |

The signal received in base band at the output from the transmultiplexer filter of the receiver can be written:

$$y_{k,n} = h_{k,n}(x_{k,n} + ji_{k,n}) + v_{k,n} \quad (8)$$

in which $y_{k,n}$ is the complex symbol received at time n on carrier k, $i_{k,n}$ is the above-mentioned interference term, $h_{k,n}$ is the channel coefficient at time n for carrier k, and $v_{k,n}$ is a noise term.

The FBMC modulation can be used for MIMO channels. In this case, the transmitter comprises $N_T > 1$ transmission antennas and the receiver comprises $N_r > 1$ reception antennas. Symbols to be transmitted are spatially multiplexed on different transmission antennas, one symbol flux being transmitted per antenna.

FIG. 1 diagrammatically shows an FBMC-MIMO transmission/reception system.

Symbols to be transmitted are denoted $x_{k,n}^l$ in which $l = 1, \ldots, N_T$ is the index of the transmission antenna. Thus, symbol $x_{k,n}^l$ is transmitted by antenna l, on carrier k, at time n. Each antenna 120 is equipped with an FBMC-OQAM modulator, 110, composed of a OQAM modulator followed by a synthesis filter bank. The characteristics of synthesis filter banks associated with the different transmission antennas are identical. In particular, they are constructed using the same prototype filter.

Consequently, the modulator 110 generates the signal:

$$s^l(m) = \sum_{k=0}^{M-1} \sum_{n \in Z} x_{k,n}^l g_{k,n}(m) \quad (9)$$

At the receiver end, the signals are received by the different reception antennas, $130_p$, $p = 1, \ldots, N_R$, each reception antenna $130_p$ being equipped with an FBMC-OQAM demodulator, $140_p$, composed of an analysis filter bank followed by an OQAM demodulator. The characteristics of analysis filter banks associated with the different reception antennas are identical. In particular, they are constructed using the same prototype filter. Complex symbols at the output from the demodulator $140_p$, denoted $y_{k,n}^p$, are input to a detector, 150, giving estimated symbols $\hat{x}_{k,n}^l$.

Ignoring the temporal index to simplify matters, $x_k = (x_{k,n}^1, \ldots, x_{k,n}^{N_T})^T$ denotes the real vector of transmitted symbols, $y_k = (y_{k,n}^1, \ldots, y_{k,n}^{N_R})^T$ denotes the complex vector of received signals, $i_k = (i_{k,n}^1, \ldots, i_{k,n}^{N_T})^T$ denotes the vector representing interference, and $H_k$ denotes the complex matrix with size $N_R \times N_T$ representing the MIMO channel at the frequency of carrier k, the relation (8) can be written in vector form:

$$y_k = H_k(x_k + ji_k) + v_k \quad (10)$$

in which $v_k$ is a noise vector.

Different types of detectors can be envisaged, particularly a Maximum Likelihood (ML) detector. Note that the principle of the ML detector is to search for:

$$y_k = H_k(x_k + ji_k) + v_k \quad (11)$$

in which $f_k$ is the maximum likelihood density of $y_k$ relative to $x_k$ (each element $y_{k,n}^p$ can be considered as a multidimensional random variable dependent on $x_{k',n'}^l \in \Omega_{k,n}$).

Alternatively, it would be possible to envisage a ZF (Zero Forcing) type detector making an estimate:

$$\hat{x}_k^{ZF} = W_k y_k \quad (12)$$

in which $W_k = (H_k^H H_k)^{-1} H_k^H$ is the pseudo-inverse matrix of $H_k$. However, it is known that a ZF detection amplifies the output noise and therefore it is not optimal. Consequently, it is preferred to use an ML detector.

However, it is very complex to use an ML detector because, as mentioned above, interference is generated by past and future symbols, both by the current carrier of the symbol considered and adjacent carriers. Assuming that the MIMO channel is known perfectly, the calculation requires that a very large number of possibilities is taken into account.

A transmission/reception system like that shown in FIG. 1 using an ML detector with soft outputs is described in the paper by M. Caus et al. entitled "Low-complexity soft-output MIMO detection in FBMC/OQAM systems" published in Proc. of Int'l Conf. on Circuits, Systems, Communications and Computers (ICCSCC), July 2014, pp. 25-29.

More precisely, this paper proposes to project equation (10) onto the real and imaginary axes, namely:

$$\begin{pmatrix} \Re(y_k) \\ \Im(y_k) \end{pmatrix} = \begin{pmatrix} -\Im(H_k) & \Re(H_k) \\ \Re(H_k) & \Im(H_k) \end{pmatrix} \begin{pmatrix} i_k \\ x_k \end{pmatrix} + \begin{pmatrix} \Re(v_k) \\ \Im(v_k) \end{pmatrix} \quad (13)$$

in which $\Re(.)$ and $\Im(.)$ denote the real part and the imaginary part respectively. It will be noted that all elements used in the vectors and the matrix in equation (13) are reals.

A QR decomposition can be made on matrix $$\tilde{H}_k = \begin{pmatrix} -\Im(H_k) & \Re(H_k) \\ \Re(H_k) & \Im(H_k) \end{pmatrix}$$

with size $2N_R \times 2N_T$: $\tilde{H}_k = Q_k R_k$ in which $Q_k$ is an orthonormal matrix with size $2N_R \times 2N_T$ and $R_k$ is an upper triangular matrix with size $2N_T \times 2N_T$, such that:

$$R_k = \begin{pmatrix} R_k^{11} & R_k^{12} \\ 0 & R_k^{22} \end{pmatrix} \quad (14)$$

in which $R_k^{11}$, $R_k^{12}$, $R_k^{22}$ are real matrices with size $N_T \times N_T$.

Considering expressions (13) and (14), we obtain:

$$Q_k^T \begin{pmatrix} \Re(y_k) \\ \Im(y_k) \end{pmatrix} = \begin{pmatrix} R_k^{11} & R_k^{12} \\ 0 & R_k^{22} \end{pmatrix} \begin{pmatrix} i_k \\ x_k \end{pmatrix} + Q_k^T \begin{pmatrix} \Re(v_k) \\ \Im(v_k) \end{pmatrix} \quad (15)$$

and therefore, if $\tilde{y}_k = (q_k^{N_r+1}, \ldots, q_k^{2N_T})^T \tilde{y}_k$ denotes the projection of the real vector $$\bar{y}_k = \begin{pmatrix} \Re(y_k) \\ \Im(y_k) \end{pmatrix}$$

onto the $N_T$ last column vectors of $Q_k$, expression (13) gives:

$$\tilde{y}_k = R_k^{22} x_k + \tilde{v}_k \quad (16)$$

in which $\tilde{v}_k = (q_k^{N_r+1}, \ldots, q_k^{2N_T})^T \tilde{v}_k$ is the real noise vector $$\bar{v}_k = \begin{pmatrix} \Re(v_k) \\ \Im(v_k) \end{pmatrix}$$

projected onto the $N_T$ last column vectors of $Q_k$.

It is essential to realise that the interference vector $i_k$ does not appear in expression (16). Since the projected noise vector, $\tilde{v}_k$, is not spatially correlated, an ML detection can be made using:

$$\hat{x}_k = \underset{x_k}{\mathrm{argmin}} \| \tilde{y}_k - R_k^{22} x_k \|^2 \quad (17)$$

This detection is much simpler that the exhaustive ML detection in which following and previous symbols, on the current carrier and on adjacent carriers, would have to be taken into account, to take account of intrinsic interference.

However, this detection does not use all available information on the symbols $x_k$ because the $N_T$ equations corresponding to the first block line of matrix $R_k$ are not used (see expression (16)) as illustrated with relation to FIG. 2.

FIG. 2 symbolically represents a transmission of symbols between the transmitter and the receiver of a 2×2 FBMC-MIMO transmission system. Only carrier k was considered, since the scheme is exactly the same for all carriers k=0, . . . , M−1.

The left of FIG. 2 shows the symbols $x_{k,n}^1$ and $x_{k,n}^2$ transmitted by antennas 1 and 2 respectively. Similarly, intrinsic interference generated by the transmultiplexer filter and affecting these same symbols is represented by $i_{k,n}^1$ and $i_{k,n}^2$.

At the receiver end, the observables obtained by projection of vector $$\bar{y}_k = \begin{pmatrix} \Re(y_k) \\ \Im(y_k) \end{pmatrix}$$

onto the $2N_T=4$ columns of $Q_k$, are represented.

The real symbols obtained by projection onto the first two columns of matrix $Q_k$ are denoted $\bar{y}_{k,n}^1$ and $\bar{y}_{k,n}^2$, components of $\bar{y}_k = (q_k^1, \ldots, q_k^{N_T})^T \tilde{y}_k$ satisfying the relation:

$$\bar{y}_k = R_k^{11} i_k + R_k^{12} x_k + \bar{v}_k \quad (18)$$

in which $\bar{v}_k$ is obtained by projection of the real noise vector $\tilde{v}_k$ onto the first two columns of matrix $Q_k$.

Similarly, the real symbols obtained by projection onto the last two columns of matrix $Q_k$ are denoted $\tilde{y}_{k,n}^1$ and $\tilde{y}_{k,n}^2$, components of $\tilde{y}_k$.

It will be understood that observables $\tilde{y}_{k,n}^1$ and $\tilde{y}_{k,n}^2$ are not used by detection, although they contain information about the transmitted symbols $x_{k,n}^1$, $x_{k,n}^2$.

The result is that this ML detector is not optimal in that it does not fully use the diversity of the system.

The above-mentioned paper recommends that the detector performances can be improved by increasing the number of antennas and therefore the diversity, which makes the receiver significantly more complex.

Consequently, the purpose of this invention is to disclose an FBMC-MIMO transmission/reception system with ML detection that has better bit error rate (BER) and signal-to-noise ratio (SNR) performances, without correspondingly increasing the number of antennas.

PRESENTATION OF THE INVENTION

This invention is defined by an FBMC-MIMO transmitter of a transmission system comprising a plurality ($N_T$) of transmission antennas and a same plurality of FBMC-OQAM modulators, each FBMC-OQAM modulator comprising an OQAM modulator and a bank of synthesis filters, each FBMC-OQAM modulator transforming a block of input symbols into FBMC symbols to be transmitted on a corresponding transmission antenna, said transmitter being advantageous in that, for each FBMC-OQAM modulator, the input symbols to a block are combined in pairs at the input to linear combination modules, a linear combination module receiving two input symbols to output a pair composed of a first combined symbol and a second combined symbol, the linear combination not being reduced to a trivial combination, the combined symbols thus obtained being interleaved in an interleaver before being input to said FBMC-OQAM modulator.

Advantageously, said linear combination is a rotation by an angle $\varphi$, the angle $\varphi$ being chosen to be not a multiple integer of $$\frac{\pi}{2}.$$

In this case, if the input symbols are QPSK symbols, the angle $\varphi$ is chosen such that $\varphi=0.15\pi$.

Alternatively, if the input symbols are 16-QAM symbols, $\varphi$ is chosen such that $\varphi=0.09\pi$.

Preferably, said interleaver interleaves combined symbols from the same pair such that they are carried by FBMC carriers that are not simultaneously affected by the same fading.

The invention also relates to an FBMC-MIMO transmission receiver comprising a plurality ($N_R$) of reception antennas and a same plurality of FBMC-OQAM demodulators, each FBMC-OQAM demodulator comprising an analysis filter bank followed by an OQAM demodulator, each FBMC-OQAM demodulator being associated with a corresponding reception antenna and, starting from the signal received on this antenna, outputting a plurality of complex symbols ($y_{k,n}^l$, k=0, . . . , M−1) corresponding to different FBMC carriers, said receiver comprising:

a plurality M of multiplexers to group symbols at the output from FBMC-OQAM demodulators by FBMC carrier, the symbols thus grouped at the output being represented in the form of a complex vector $(y_k=(y_{k,n}^1, \ldots, y_{k,n}^{N_R})^T)$ with size $N_R$, each complex vector being associated with an FBMC carrier;

a deinterleaver to deinterleave the complex vectors thus obtained and to supply them in the form of pairs of complex vectors $(y_k, y_{k'})$;

a plurality M of projection modules, each projection module being associated with an FBMC carrier, $k=0, \ldots, M-1$, and projecting the complex vector associated with this carrier onto the $N_T$ last columns of an orthonormal matrix $Q_k$ with size $2N_R \times 2N_T$ obtained by QR decomposition of matrix $$\breve{H}_k = \begin{pmatrix} -\Im(H_k) & \Re(H_k) \\ \Re(H_k) & \Im(H_k) \end{pmatrix}$$

in which $H_k$ is the matrix with size $N_R \times N_T$ representing the MIMO channel for carrier k, each projection module outputting a projected real vector $(\tilde{y}_k)$ with size $2N_T$;

a plurality of maximum likelihood detection modules, each of these modules receiving a pair of real vectors thus projected and using them to obtain the most probable transmitted symbols $(\hat{x}_k, \hat{x}_{k+1})$.

Advantageously, each maximum likelihood detection module receiving two projected real vectors $\tilde{y}_k, \tilde{y}_{k'}$, searches for the most probable transmitted symbols $\hat{x}_k, \hat{x}_{k+1}$ by means of $$\hat{x}_{k,k+1} = \underset{x_k, x_{k+1}}{\arg\min} \|\tilde{y}_{k,k'} - R_{k,k'}^{22}(A)x_{k,k+1}\|^2 \text{ with } x_{k,k+1} = \begin{pmatrix} x_k \\ x_{k+1} \end{pmatrix},$$

$$\tilde{y}_{k,k'} = \begin{pmatrix} \tilde{y}_k \\ \tilde{y}_{k'} \end{pmatrix}, R_{k,k'}^{22}(A) = \begin{pmatrix} R_k^{22} & 0 \\ 0 & R_{k'}^{22} \end{pmatrix} R_A,$$

in which the matrices $R_k^{22}$ and $R_{k'}^{22}$ were obtained by QR decomposition of matrices $\breve{H}_k$ and $\breve{H}_{k'}$ respectively, and $R_A$ is the matrix defined by:

$$R_A = \begin{pmatrix} a_{11} & a_{12} & 0 & 0 & \ldots & 0 & 0 & 0 & \ldots & 0 \\ 0 & 0 & 0 & \ldots & 0 & a_{11} & a_{12} & 0 & \ldots & 0 \\ 0 & 0 & a_{11} & a_{12} & \ddots & 0 & 0 & 0 & \ddots & \vdots \\ \vdots & \vdots & \ddots & \ldots & \ldots & \ddots & \ddots & \ddots & \ddots & \vdots \\ 0 & 0 & \ldots & \ddots & \ldots & \ldots & \ldots & 0 & a_{11} & a_{12} \\ a_{21} & a_{22} & 0 & 0 & \ldots & 0 & 0 & 0 & \ldots & 0 \\ 0 & 0 & 0 & \ldots & 0 & a_{21} & a_{22} & 0 & \ldots & 0 \\ 0 & 0 & a_{21} & a_{22} & \ddots & 0 & 0 & 0 & \ldots & 0 \\ \vdots & \vdots & \ddots & \ldots & \ldots & \ddots & \ddots & \ddots & \ddots & \vdots \\ 0 & 0 & 0 & \ldots & \ldots & \ldots & \ldots & 0 & a_{21} & a_{22} \end{pmatrix}$$

in which $$A = \begin{pmatrix} a_{11} & a_{12} \\ a_{21} & a_{22} \end{pmatrix}$$

is the matrix representing the linear combination of symbols $x_k, x_{k+1}$, used in transmission.

Advantageously, matrix A is a rotation matrix with an angle $\varphi$, chosen to be not an integer multiple of $$\frac{\pi}{2}.$$

Maximum likelihood detection modules preferably have soft outputs and each uses a sphere decoder.

BRIEF DESCRIPTION OF THE DRAWINGS

Other characteristics and advantages of the invention will become clear after reading preferred embodiments of the invention, with reference to the appended figures among which.

DETAILED PRESENTATION OF PARTICULAR EMBODIMENTS

The basic concept of this invention is to group symbols to be transmitted in pairs and to combine the symbols in each pair in the form of two distinct combinations, the combined symbols thus obtained being transmitted on two distinct FBMC carriers. It is thus proposed to introduce an additional degree of diversity by distributing information about a symbol to be transmitted on two independent carriers.

Figure 3:
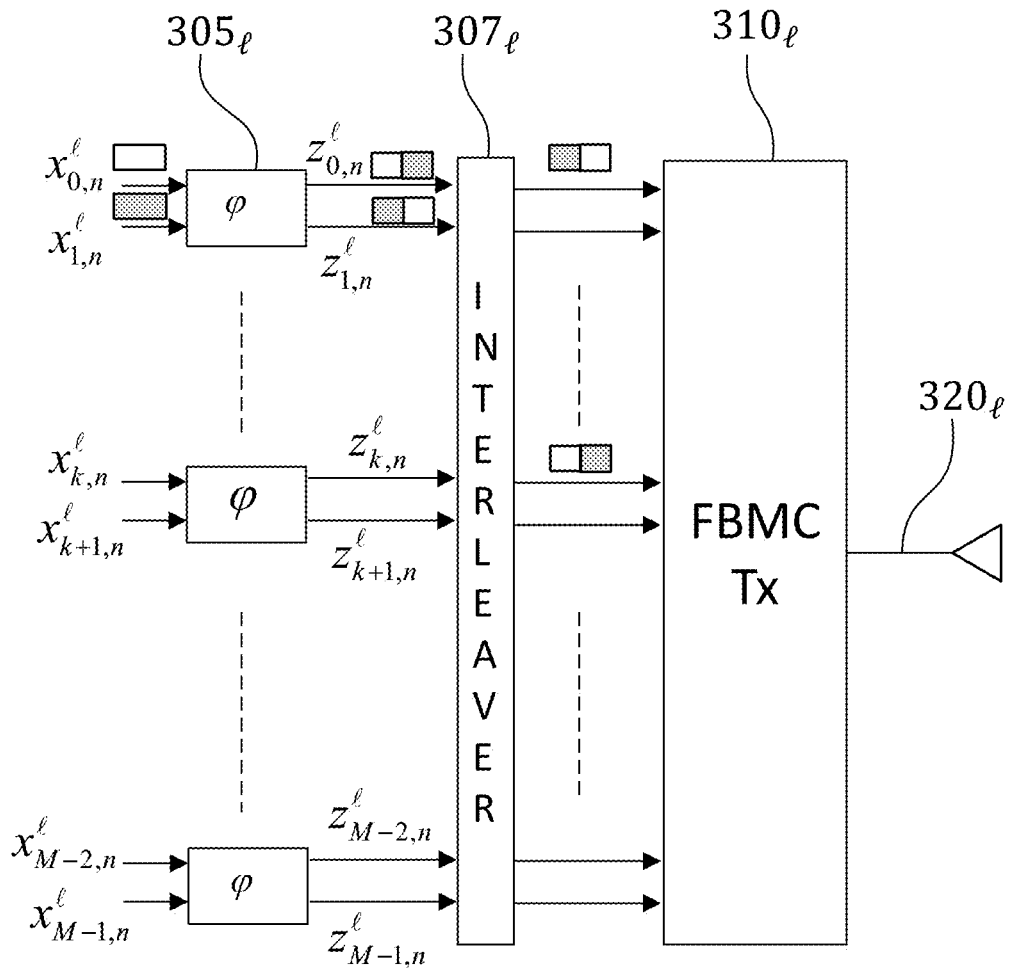
FIG. 3 diagrammatically represents a transmitter of an FBMC-MIMO system according to one embodiment of the invention.

FIG. 3 diagrammatically represents a transmitter of an FBMC-MIMO system according to one embodiment of the invention.

This figure shows the transmitter in relation to an arbitrary antenna $l=1, \ldots, N_T$, all transmitters having the same structure. In particular, the characteristics of synthesis filter banks associated with the different transmission antennas are the same.

Figure 1:
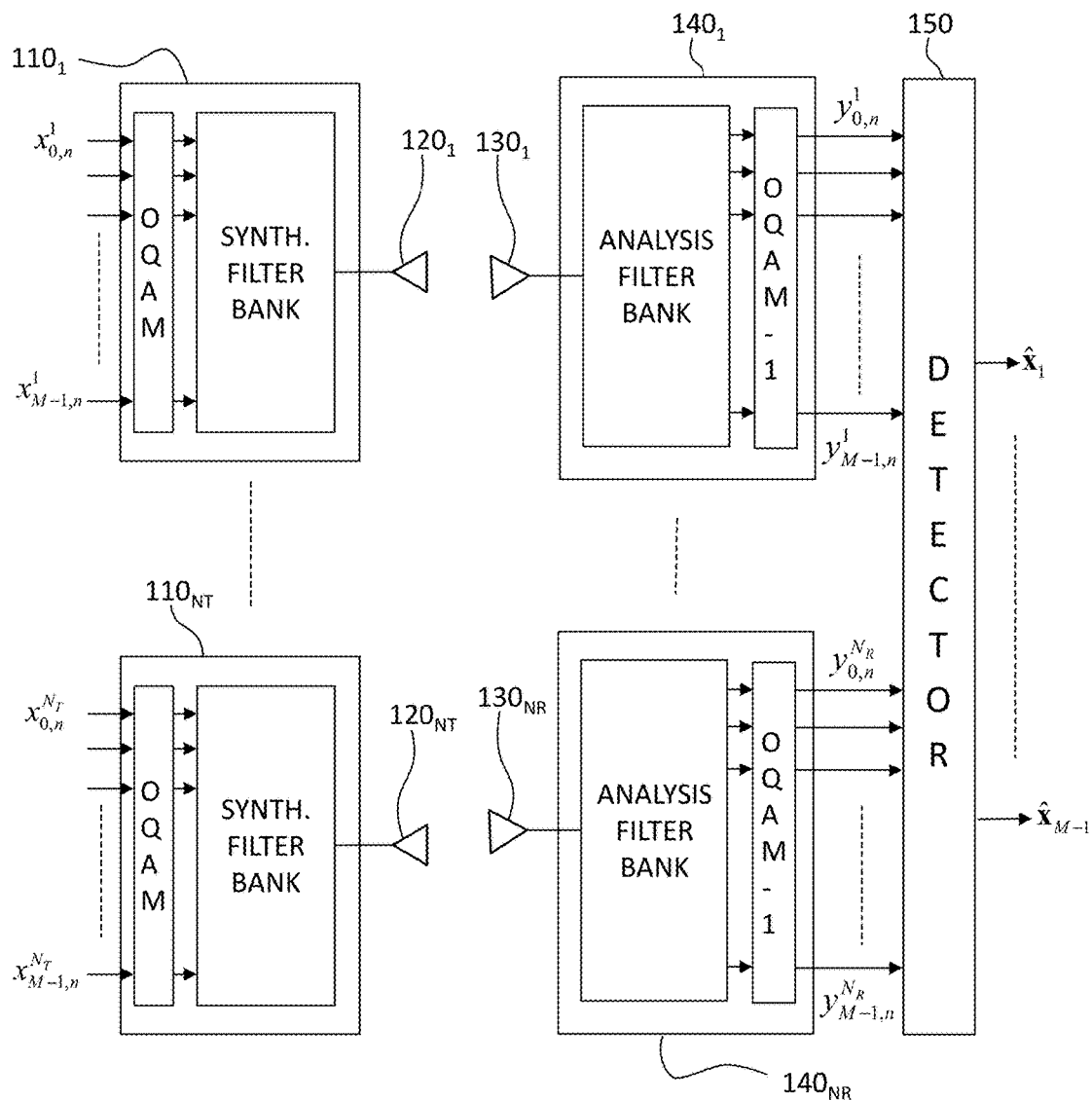
FIG. 1 diagrammatically shows a known FBMC-MIMO transmission/reception system according to the state of the art.

The transmitter comprises an FBMC-OQAM modulator 310 composed of an OQAM modulator and a synthesis filter bank that can be made in the time domain (polyphase filter) or in the frequency domain as indicated in the introduction part. This FBMC-OQAM modulator is identical to the modulators $110_1, \ldots, 110_{N_T}$ represented in FIG. 1.

The transmitter receives real symbols to be transmitted at its input, represented by $x_{0,n}^l, \ldots, x_{M-1,n}^l$, the $x_{k,n}^l$ symbol relating to time n (or block n), to carrier k and to antenna l.

Symbols are grouped in pairs and a combination module 305 calculates two distinct linear combinations for each pair of symbols. It should be noted that the symbols of a particular pair are not necessarily contiguous. However, in order to simplify the presentation while remaining perfectly general, we assume in the following that the sequence of symbols in a particular pair is actually contiguous. Thus, two consecutive symbols, $x_{2\kappa,n}^l$ and $x_{2\kappa+1,n}^l$, even and odd ranks respectively, are combined in the following form:

$$\begin{pmatrix} z_{k,n}^l \\ z_{k+1,n}^l \end{pmatrix} = A_k \begin{pmatrix} x_{k,n}^l \\ x_{k+1,n}^l \end{pmatrix} \quad (19)$$

in which $A_k$ are non-trivial 2×2 matrices, in other words all the elements are non-null. In particular, the matrices $A_k$ are distinct from the unit matrix and the null matrix.

The matrices $A_k$ can depend on k but they are preferably chosen to be identical $A_k = A$. According to one example embodiment, A will be chosen equal to a rotation matrix:

$$A = A_\varphi = \begin{pmatrix} \cos\varphi & \sin\varphi \\ -\sin\varphi & \cos\varphi \end{pmatrix} \quad (20)$$

where $$\varphi \neq \mu \frac{\pi}{2}$$

in which μ is a relative integer.

The combined symbols are then interleaved by an interleaver, 307, such that two combined signals $z_{k,n}^l$ and $z_{k+1,n}^l$ derived from the same pair are transmitted on different carriers. These carriers will advantageously be chosen to be independent, in other words at a sufficient spacing so as to not be affected by fading at the same time. The interleaving function σ is identical regardless of the transmitter.

In the following, it will be assumed that at the output from the interleaver, the combined symbol $z_{k,n}^l$ is carried by the carrier k and the combined symbol $z_{k-1,n}^l$ is carried by the carrier k'. Thus, after interleaving, $z_{k',n}^l$ corresponds to $z_{k+1,n}^l$.

The combined symbols thus interleaved are input to the FBMC-OQAM modulator to be transmitted on the MIMO channel.

Figure 4:
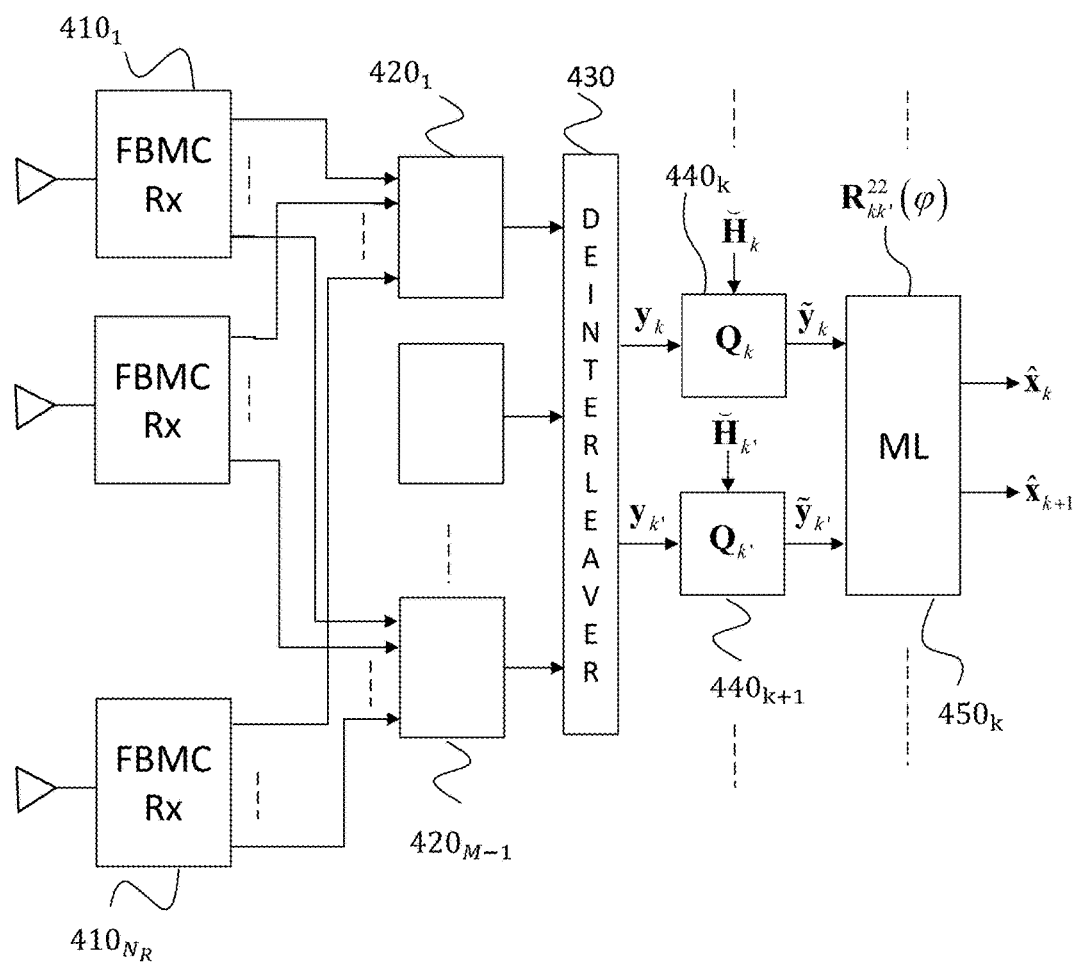
FIG. 4 diagrammatically represents a receiver of an FBMC-OFDM system according to one embodiment of the invention.

FIG. 4 diagrammatically represents a receiver of an FBMC-OFDM system according to one embodiment of the invention.

This receiver comprises a plurality of FBMC-OQAM demodulators, $410_1, \ldots, 410_{N_R}$, each demodulator being associated with one reception antenna $l=1, \ldots, N_R$. Each demodulator comprises an analysis filter bank that can be made in the temporal domain or in the frequency domain, and an OQAM demodulator. These demodulators have the same structure as those shown $140_1, \ldots, 140_{N_R}$ on FIG. 1.

In particular, the characteristics of analysis filter banks associated with the different reception antennas are the same.

Each FBMC-OQAM demodulator, 410, outputs a block of complex symbols $y_{k,n}^l$, $k=1, \ldots, M-1$ at time n. These symbol blocks are grouped by carrier in the multiplexers $420_1, \ldots, 420_{M-1}$, each multiplexer $420_k$ being associated with a carrier $k^k$ and outputting the symbols $y_{k,n}^l$, $l=1, \ldots, N_R$, in the form of a complex vector $y_k = (y_{k,n}^1, \ldots, y_{k,n}^{N_R})^T$ with size $N_R$.

The symbol vectors thus obtained are then deinterleaved by a deinterleaver performing the inverse operation ($\sigma^{-1}$) to that done at the transmitters.

In the following, two vectors $y_k$ and $y_{k'}$ corresponding to two carriers k and k+1 before interleaving will be considered.

Vector $y_k$ is projected onto the $N_T$ last column vectors of the matrix $Q_k$, obtained by QR decomposition of the matrix $\check{H}_k$ defined above. The vector thus projected is a real vector, denoted $\tilde{y}_k$, with size $N_T$.

Similarly, vector $y_{k'}$ is projected onto the $N_T$ last column vectors of the matrix $Q_{k'}$, obtained by QR decomposition of the matrix $\check{H}_{k'}$. The vector thus projected is a real vector, denoted $\tilde{y}_{k'}$, also with size $\tilde{y}_k$, $N_T$.

According to (16), we have the following relations:

$$\tilde{y}_k = R_k^{22} z_k + \tilde{v}_k \quad (21\text{-}1)$$

$$\tilde{y}_{k'} = R_{k'}^{22} z_{k'} + \tilde{v}_{k'} \quad (21\text{-}2)$$

that we can formally define more synthetically by:

$$\begin{pmatrix} \tilde{y}_k \\ \tilde{y}_{k'} \end{pmatrix} = \begin{pmatrix} R_k^{22} & 0 \\ 0 & R_{k'}^{22} \end{pmatrix} \begin{pmatrix} z_k \\ z_{k'} \end{pmatrix} + \begin{pmatrix} \tilde{v}_k \\ \tilde{v}_{k'} \end{pmatrix} \quad (22)$$

or, allowing for the fact that $$\begin{pmatrix} z_{k,n}^l \\ z_{k',n}^l \end{pmatrix} = A_\varphi \begin{pmatrix} x_{k,n}^l \\ x_{k+1,n}^l \end{pmatrix}$$

for $l=1, \ldots, N_R$:

$$\begin{pmatrix} \tilde{y}_k \\ \tilde{y}_{k'} \end{pmatrix} = R_{k,k'}^{22}(\varphi) \begin{pmatrix} x_k \\ x_{k+1} \end{pmatrix} + \begin{pmatrix} \tilde{v}_k \\ \tilde{v}_{k'} \end{pmatrix} \quad (23\text{-}1)$$

in which:

$$R_{k,k'}^{22}(\varphi) = \begin{pmatrix} R_k^{22} & 0 \\ 0 & R_{k'}^{22} \end{pmatrix} R_\varphi \quad (23\text{-}2)$$

where $R_\varphi$ is the matrix with size $2N_T \times 2N_T$ defined by:

$$R_\varphi = \begin{pmatrix} \cos\varphi & \sin\varphi & 0 & 0 & \ldots & 0 & 0 & 0 & \ldots & 0 \\ 0 & 0 & 0 & \ldots & 0 & \cos\varphi & \sin\varphi & 0 & \ldots & 0 \\ 0 & 0 & \cos\varphi & \sin\varphi & \ddots & 0 & 0 & 0 & \ddots & \vdots \\ \vdots & \vdots & \ddots & \ldots & \ldots & \ddots & \ddots & \ddots & \ddots & \vdots \\ 0 & 0 & \ldots & \ddots & \ldots & \ldots & \ldots & 0 & \cos\varphi & \sin\varphi \\ -\sin\varphi & \cos\varphi & 0 & 0 & \ldots & 0 & 0 & 0 & \ldots & 0 \\ 0 & 0 & 0 & \ldots & 0 & -\sin\varphi & \cos\varphi & 0 & \ldots & 0 \\ 0 & 0 & -\sin\varphi & \cos\varphi & \ddots & 0 & 0 & 0 & \ldots & 0 \\ \vdots & \vdots & \ddots & \ldots & \ldots & \ddots & \ddots & \ddots & \ddots & \vdots \\ 0 & 0 & 0 & \ldots & \ldots & \ldots & \ldots & 0 & -\sin\varphi & \cos\varphi \end{pmatrix} \quad (23\text{-}3)$$

Namely for example in the case of 2 transmission antennas:

$$R_\varphi = \begin{pmatrix} \cos\varphi & \sin\varphi & 0 & 0 \\ 0 & 0 & \cos\varphi & \sin\varphi \\ -\sin\varphi & \cos\varphi & 0 & 0 \\ 0 & 0 & -\sin\varphi & \cos\varphi \end{pmatrix} \quad (23\text{-}4)$$

More generally, when a non-trivial linear combination matrix $$A = \begin{pmatrix} a_{11} & a_{12} \\ a_{21} & a_{22} \end{pmatrix}$$

is used to combine symbols at the transmitter, the expressions (23-1), (23-2) and (23-3) become:

$$\begin{pmatrix} \tilde{y}_k \\ \tilde{y}_{k'} \end{pmatrix} = R^{22}_{k,k'}(A) \begin{pmatrix} x_k \\ x_{k+1} \end{pmatrix} + \begin{pmatrix} \tilde{v}_k \\ \tilde{v}_{k'} \end{pmatrix} \quad (24\text{-}1)$$

$$R^{22}_{k,k'}(A) = \begin{pmatrix} R^{22}_k & 0 \\ 0 & R^{22}_{k'} \end{pmatrix} R_A \quad (24\text{-}2)$$

where $R_A$ is the matrix with size $2N_T \times 2N_T$ defined by:

$$R_A = \begin{pmatrix} a_{11} & a_{12} & 0 & 0 & \ldots & 0 & 0 & 0 & \ldots & 0 \\ 0 & 0 & 0 & \ldots & 0 & a_{11} & a_{12} & 0 & \ldots & 0 \\ 0 & 0 & a_{11} & a_{12} & \ddots & 0 & 0 & 0 & \ddots & \vdots \\ \vdots & \vdots & \ddots & \ldots & \ldots & \ddots & \ddots & \ddots & \ddots & \vdots \\ 0 & 0 & \ldots & \ddots & \ldots & \ldots & \ldots & 0 & a_{11} & a_{12} \\ a_{21} & a_{22} & 0 & 0 & \ldots & 0 & 0 & 0 & \ldots & 0 \\ 0 & 0 & 0 & \ldots & 0 & a_{21} & a_{22} & 0 & \ldots & 0 \\ 0 & 0 & a_{21} & a_{22} & \ddots & 0 & 0 & 0 & \ldots & 0 \\ \vdots & \vdots & \ddots & \ldots & \ldots & \ddots & \ddots & \ddots & \ddots & \vdots \\ 0 & 0 & 0 & \ldots & \ldots & \ldots & \ldots & 0 & a_{21} & a_{22} \end{pmatrix} \quad (24\text{-}3)$$

In all cases, the projected real vectors, $\tilde{y}_k$, $\tilde{y}_{k'}$, are input to an ML detector $450_k$ that estimates the most probable vectors $\hat{x}_k$ and $\hat{x}_{k+1}$, taking account of these observables, channel matrices $\check{H}_k$ and $\check{H}_{k'}$ (from which the upper triangular matrices $R^{22}_k$ and $R^{22}_{k'}$) and the linear combination matrix A are deduced.

In other words, the vectors $\hat{x}_k$ and $\hat{x}_{k+1}$ are determined by:

$$\hat{x}_{k,k+1} = \underset{x_k, x_{k+1}}{\arg\min} \|\tilde{y}_{k,k'} - R^{22}_{k,k'}(A) x_{k,k+1}\|^2 \quad (25)$$

and more particularly when matrix A is a rotation matrix:

$$\hat{x}_{k,k+1} = \underset{x_k, x_{k+1}}{\arg\min} \|\tilde{y}_{k,k'} - R^{22}_{k,k'}(\varphi) x_{k,k+1}\|^2 \quad (26)$$

in which $$x_{k,k+1} = \begin{pmatrix} x_k \\ x_{k+1} \end{pmatrix} \text{ and } \tilde{y}_{k,k'} = \begin{pmatrix} \tilde{y}_k \\ \tilde{y}_{k'} \end{pmatrix}.$$

The ML detector may be of the type with soft values as described in the paper by M. Caus et al. mentioned above. Alternatively, it may be a Sphere Decoder.

Figure 5:
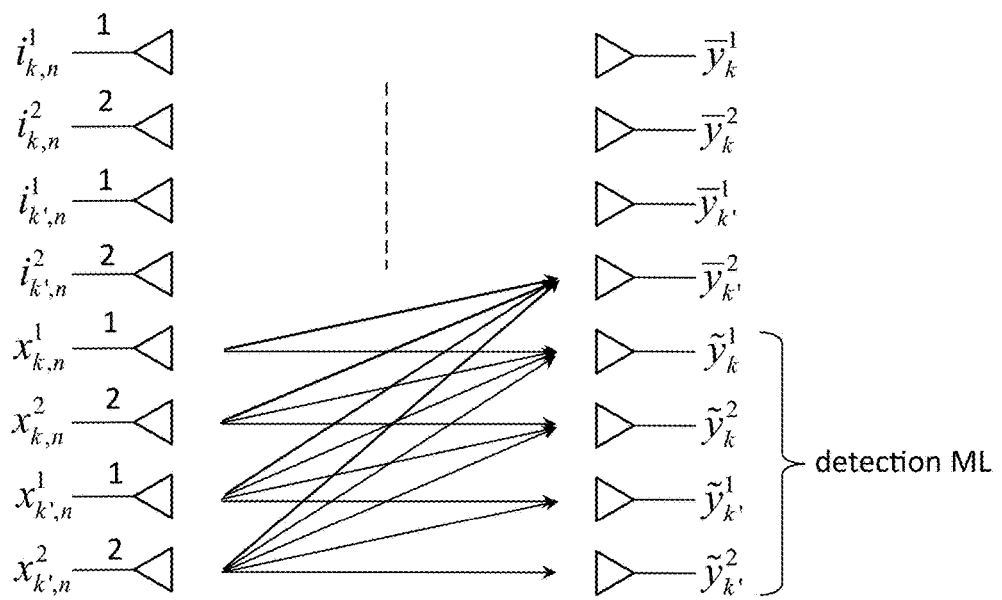
FIG. 5 diagrammatically represents a transmission of symbols between a transmitter according to FIG. 3 and a receiver according to FIG. 4.

FIG. 5 diagrammatically represents a transmission of symbols between a transmitter and a receiver of an FBMC-OFDM system according to one example embodiment of the invention.

The FBMC-MIMO system considered is also 2×2, in other words it has 2 transmission antennas and 2 reception antennas. The structures of the transmitters and the receiver are shown in FIGS. 3 and 4 respectively.

At the left of FIG. 5, $x_{k,n}^1$ and $x_{k,n}^2$ represent the symbols transmitted by antennas 1 and 2 respectively on carrier k, and $x_{k',n}^1$ and $x_{k',n}^2$ represent the symbols transmitted by the same antennas on carrier k' in which k'=σ(k).

Similarly, intrinsic interference generated by the transmultiplexer filter and affecting these same symbols on carrier k is represented by $i_{k,n}^1$ and $i_{k,n}^2$, and by $i_{k',n}^1$ and $i_{k',n}^2$ At the receiver end, the observables obtained by projection of vectors $$\tilde{y}_k = \begin{pmatrix} \Re(y_k) \\ \Im(y_k) \end{pmatrix} \text{ and } \tilde{y}_{k'} = \begin{pmatrix} \Re(y_{k'}) \\ \Im(y_{k'}) \end{pmatrix}$$

onto the $N_T$ last column vectors of $Q_k$ and $Q_{k'}$, are represented by $$\tilde{y}_k = \begin{pmatrix} \tilde{y}_{k'}^1 \\ \tilde{y}_k^2 \end{pmatrix} \text{ and } \tilde{y}_{k'} = \begin{pmatrix} \tilde{y}_{k'}^1 \\ \tilde{y}_{k'}^2 \end{pmatrix}$$

respectively.

Figure 2:
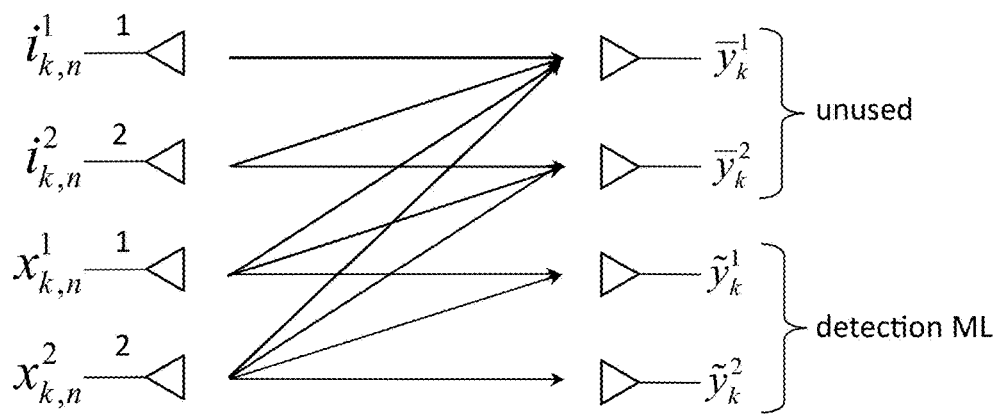
FIG. 2 diagrammatically represents a transmission of symbols between the transmitter and the receiver of a system according to FIG. 1.

The fact that two carriers are combined makes it possible to have twice as many observables as in prior art represented in FIG. 2. Everything takes place as if the number of transmission and reception antennas had been virtually doubled.

Figure 6A:
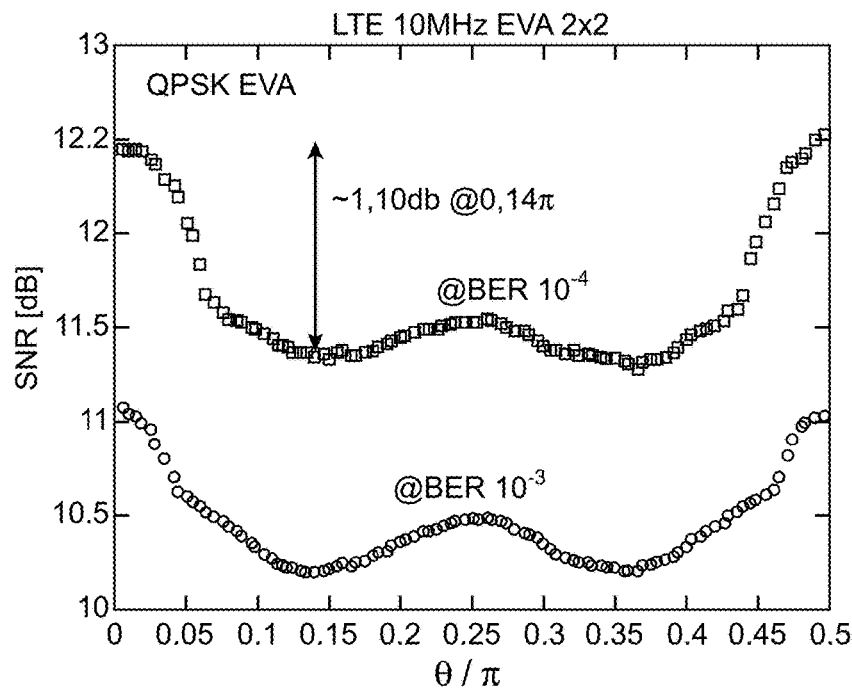
FIGS. 6A and 6B illustrate the performances of an FBMC-MIMO according to one example embodiment of the invention in the case in which QPSK symbols are transmitted.
Figure 6B:
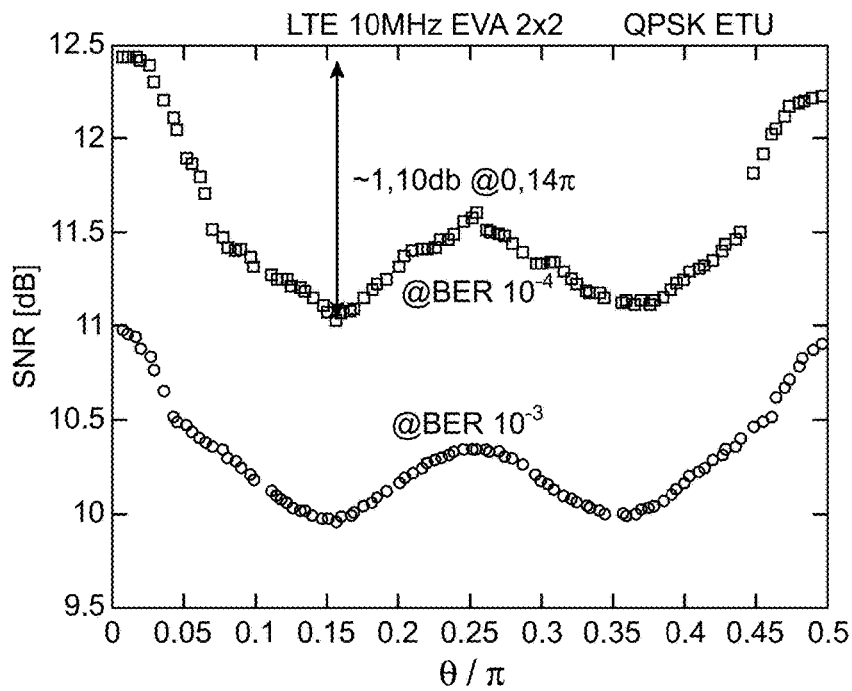

FIGS. 6A and 6B illustrate the performances of an FBMC-MIMO system according to one example embodiment of the invention, for an EVA (Extended Vehicular A) LTE channel and an ETU (Extended Typical Urban) LTE channel.

The FBMC-MIMO system considered used $N_T=2$ transmission antennas and $N_R=2$ reception antennas. The number of carriers was chosen to be equal to 50 out of 1024. A convolutional code with rate ⅔ was used.

The symbols to be transmitted were QPSK symbols. The ML detector was chosen with soft outputs as in the paper by M. Caus et al. mentioned above.

It can be seen in FIG. 6A that a gain of 1.10 dB on the signal-to-noise ratio can be achieved for a BER (bit error rate) equal to $10^{-4}$ if $\varphi=0.15\pi$ is chosen. Performances of the known system according to prior art correspond to $\varphi=0$ (no rotation).

Similarly, it can be seen on FIG. 6B that a gain of 1.5 dB on the signal-to-noise ratio can be reached if we choose $\varphi=0.15\pi$.

More generally, it can be shown that there is an optimum angle $\varphi$ for each type of modulation alphabet. Thus, when the symbols to be transmitted belong to a 16-QAM alphabet, the optimum angle $\varphi=0.09\pi$.

The invention claimed is:

1. A transmitter of a Filter Bank Multi-Carrier-Multiple Input Multiple Output (FBMC-MIMO) transmission system comprising:
   a plurality ($N_T$) of transmission antennas; and
   a plurality of Filter Bank Multi-Carrier-Offset Quadrature Amplitude Modulation (FBMC-OQAM) modulators equal in number to the plurality of transmission antennas, each FBMC-OQAM modulator comprising an OQAM modulator and a bank of synthesis filters, each FBMC-OQAM modulator transforming a block of input symbols into FBMC symbols to be transmitted on a corresponding transmission antenna,
   wherein, for each FBMC-OQAM modulator, the input symbols of a block are combined in pairs at the input to linear combination circuits, a linear combination circuit receiving two input symbols thus paired to output a pair including a first combined symbol based on the two input symbols and a second combined symbol based on the two input symbols, the linear combination being obtained by means of combination coefficients that are all not null, the combined symbols thus obtained being interleaved in an interleaver before being input to said FBMC-OQAM modulator.

2. The transmitter of the FBMC-MIMO transmission system according to claim 1, wherein the linear combination is a rotation by angle $\varphi$, the angle $\varphi$ being chosen to be not equal to an integer multiple of $\frac{\pi}{2}$.

3. The transmitter of the FBMC-MIMO transmission system according to claim 2, wherein the input symbols are Quadrature Phase Shift Keying (QPSK) symbols and that $\varphi=0.15\pi$.

4. The transmitter of the FBMC-MIMO transmission system according to claim 2, wherein the input symbols are 16-QAM symbols and $\varphi=0.09\pi$.

5. The transmitter of the FBMC-MIMO transmission system according to claim 1, wherein said interleaver interleaves combined symbols from the same pair such that they are carried by FBMC carriers that are not simultaneously affected by the same fading.

6. A receiver of a Filter Bank Multi-Carrier-Multiple Input Multiple Output FBMC-MIMO transmission system comprising a plurality ($N_R$) of reception antennas and a same plurality of Filter Bank Multi-Carrier-Offset Quadrature Amplitude Modulation (FBMC-OQAM) demodulators, each FBMC-OQAM demodulator comprising an analysis filter bank followed by an OQAM demodulator, each FBMC-OQAM demodulator being associated with a corresponding reception antenna and, starting from a signal received on this antenna, outputting a plurality of complex symbols ($y_{k,n}^l$, k=0, . . . , M−1) corresponding to different FBMC carriers, M being a number of FBMC carriers, wherein said receiver comprises:
   a plurality M of multiplexers to group symbols at outputs from FBMC-OQAM demodulators by FBMC carrier, the symbols thus grouped at the output being represented in the form of a complex vector ($y_k = (y_{k,n}^l, \ldots, y_{k,n}^{N_R})^T$) with size $N_R$, each complex vector being associated with an FBMC carrier, T being a time interval separating consecutive symbol blocks;
   a deinterleaver to deinterleave the complex vectors thus obtained and to supply them in the form of pairs of complex vectors ($y_k, y_k$);
   a plurality M of projection circuits, each projection circuit being associated with the FBMC carrier, k=0, . . . ,M−1, and projecting the complex vector associated with this carrier onto the $N_T$ last columns of an orthonormal matrix $Q_k$ with size $2N_R \times 2N_T$ obtained by QR decomposition of matrix $$\breve{H}_k = \begin{pmatrix} -\Im(H_k) & \Re(H_k) \\ \Re(H_k) & \Im(H_k) \end{pmatrix}$$

in which $H_k$ is the matrix with size $N_R \times N_T$ representing a MIMO channel for carrier k, each projection circuit outputting a projected real vector ($\tilde{y}_k$) with size $2N_T$, $N_T$ being a number of transmission antennas;
   a plurality of maximum likelihood detection circuits, each of these circuits receiving a pair of real vectors thus projected and using them to deduce a pair of transmitted symbols ($\hat{x}_k, \hat{x}_{k+1}$), a most probable having been combined using a linear combination during transmission.

7. The receiver of the FBMC-MIMO transmission system according to claim 6, wherein a maximum likelihood detection circuit receiving two projected real vectors $\tilde{y}_k, \tilde{y}_{k'}$ searches for a most probable transmitted symbols $\hat{x}_k, \hat{x}_{k+1}$ by means of $$\hat{x}_{k,k+1} = \arg\min_{x_k, x_{k+1}} \|\tilde{y}_{k,k'} - R^{22}_{k,k'}(A)x_{k,k+1}\|^2 \text{ with } x_{k,k+1} = \begin{pmatrix} x_k \\ x_{k+1} \end{pmatrix},$$

$$\tilde{y}_{k,k'} = \begin{pmatrix} y_k^{\%} \\ y_{k'}^{\%} \end{pmatrix}, \quad R^{22}_{k,k'}(A) = \begin{pmatrix} R^{22}_k & 0 \\ 0 & R^{22}_{k'} \end{pmatrix}$$

$R_A$ in which the matrices $R_k^{22}$ and $R_{k'}^{22}$ were obtained by QR decomposition of matrices $\tilde{H}_k$ and $\tilde{H}_{k'}$, respectively, and $R_A$ is the matrix defined by:

$$R_A = \begin{pmatrix} a_{11} & a_{12} & 0 & 0 & \cdots & 0 & 0 & 0 & \cdots & 0 \\ 0 & 0 & 0 & \cdots & 0 & a_{11} & a_{12} & 0 & \cdots & 0 \\ 0 & 0 & a_{11} & a_{12} & \ddots & 0 & 0 & 0 & \ddots & \vdots \\ \vdots & \vdots & \ddots & \cdots & \cdots & \ddots & \ddots & \ddots & \ddots & \vdots \\ 0 & 0 & \cdots & \ddots & \cdots & \cdots & \cdots & 0 & a_{11} & a_{12} \\ a_{21} & a_{22} & 0 & 0 & \cdots & 0 & 0 & 0 & \cdots & 0 \\ 0 & 0 & 0 & \cdots & 0 & a_{21} & a_{22} & 0 & \cdots & 0 \\ 0 & 0 & a_{21} & a_{22} & \ddots & 0 & 0 & 0 & \cdots & 0 \\ \vdots & \vdots & \ddots & \cdots & \cdots & \ddots & \ddots & \ddots & \ddots & \vdots \\ 0 & 0 & 0 & \cdots & \cdots & \cdots & \cdots & 0 & a_{21} & a_{22} \end{pmatrix}$$

in which $$A = \begin{pmatrix} a_{11} & a_{12} \\ a_{21} & a_{22} \end{pmatrix}$$

is the matrix representing the linear combination of symbols $x_k$, $x_{k+1}$, used in transmission.

8. The receiver of the FBMC-MIMO transmission system according to claim 7, wherein matrix A is a rotation matrix to rotate by an angle φ, chosen to be not equal to an integer multiple of $$\frac{\pi}{2}.$$

9. The receiver of the FBMC-MIMO transmission system according to claim 6, wherein the maximum likelihood detection circuits have soft outputs.

10. The receiver of the FBMC-MIMO transmission system according to claim 6, wherein each of the maximum likelihood detection circuits uses a sphere decoder.

* * * * *